UNITED STATES PATENT OFFICE.

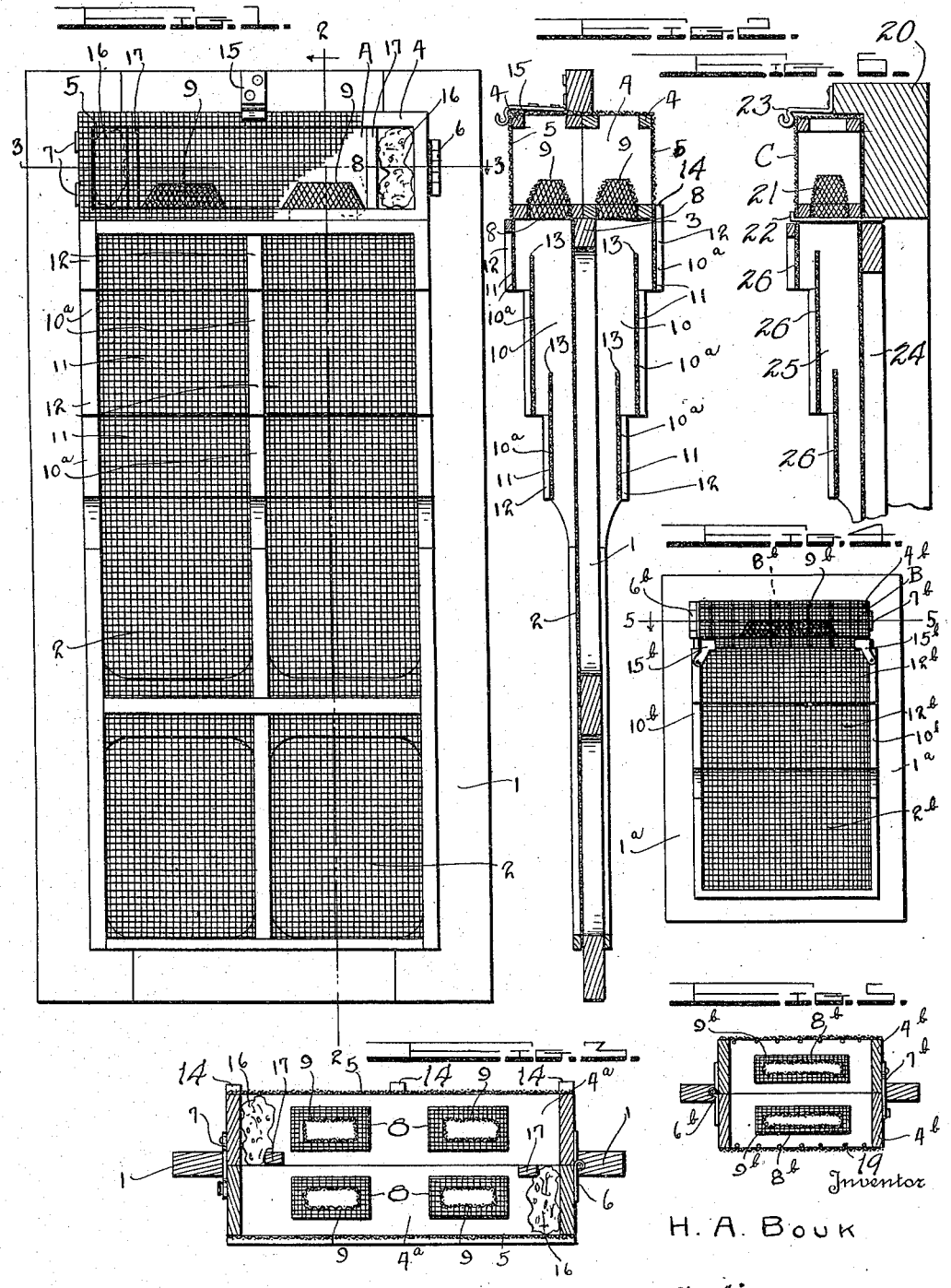

HENRY A. BOUK, OF SEATTLE, WASHINGTON, ASSIGNOR OF TWENTY-FIVE ONE-HUNDREDTHS TO EDWARD PETERSON AND TWENTY-FIVE ONE-HUNDREDTHS TO PHILIP JOHNSON, BOTH OF SEATTLE, WASHINGTON; CHARLES W. BOUK ADMINISTRATOR OF SAID HENRY A BOUK, DECEASED.

FLY-TRAP SCREEN.

1,176,336.     Specification of Letters Patent.     Patented Mar. 21, 1916.

Application filed July 9, 1915. Serial No. 38,984.

*To all whom it may concern:*

Be it known that I, HENRY A. BOUK, a citizen of the United States, residing at Seattle, in the county of King and State of Washington, have invented certain new and useful Improvements in Fly-Trap Screens, of which the following is a specification.

The present invention relates to certain new and useful improvements in combination screens and fly traps, and has for its object to provide a device of this character which can be readily embodied in a screen door or window screen and will operate in an effective manner to catch the flies and exclude them from the house.

Further objects of the invention are to provide a device of this character which is comparatively simple and inexpensive in its construction, which does not interfere in any manner with the usual use of the screen door or window screen, which takes advantage of the tendency of a fly to walk upwardly upon the screen to lead it into a trap inclosure, and which admits of the trap inclosure being easily and quickly detached for the purpose of killing and removing the flies.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a front elevation of a combination screen door and fly trap constructed in accordance with the invention. Fig. 2 is a vertical sectional view through the same on the line 2—2 of Fig. 1, looking in the direction of the arrow. Fig. 3 is a horizontal sectional view on the line 3—3 of Fig. 1, looking in the direction of the arrow. Fig. 4 is a front elevation of a combined window screen and fly trap constructed in accordance with the invention. Fig. 5 is a horizontal sectional view on the line 5—5 of Fig. 4, looking in the direction of the arrow. Fig. 6 is a vertical sectional view through the top of a screen door and door casing, showing a further modification of the invention.

Corresponding and like parts are referred to in the following description and indicated in all the views of the drawings by the same reference characters.

Referring to Figs. 1, 2 and 3 of the drawing, the numeral 1 designates the frame of a screen door, the usual wire screen 2 being stretched upon the same. A cross bar 3 to which the upper edge of the wire fabric 2 is attached connects the stiles of the frame 1 at a point toward the top of the door so as to provide a pocket for the reception of the trap box A, said trap box being preferably constructed so as to project upon opposite sides of the door so that flies can enter the trap from both the inside and the outside of the house. The trap box A in its specific construction comprises a substantially rectangular frame which is divided longitudinally upon its median line to provide similar complemental sections 4, 4. These complemental sections communicate with each other and have wire fabric 5 stretched across the top and outer sides thereof. At one end of the trap box A the complemental sections 4, 4 are hingedly connected at 6, while at the opposite end of the trap box suitable fastening members such as the hooks 7 are provided for holding the complemental sections together. The bottom $4^a$ of each of the complemental sections 4 of the trap box A is provided with inlet openings 8 having upwardly extending and tapered entrance channels 9 applied to the edges thereof, said members 9 being preferably formed of a wire fabric having a comparatively fine mesh. When the trap box A is positioned within the opening at the top of the screen door so as to close the said opening and project laterally upon opposite sides of the screen door, the inlet openings 8 of one complemental section 4 are arranged upon one side of the cross bar 3 and the inlet openings 8 of the opposite complemental section on the other side of the cross bar 3. Flies can thus enter the trap box A from both the inside and the outside of the house, and the tapered sleeves 9 projecting into the trap box from the inlet openings 8 make it easy for the flies to enter the trap box, but difficult for them to find the way out. Secured to the vertical members of the screen door frame 1 upon opposite sides thereof are the upright strips 10 which have the upper ends thereof flush with the top of the cross bar 3, while the outer edges thereof are formed with the corresponding steps 10ª. Vertically disposed strips of wire fabric 11 extend transversely across the door and are secured to the corresponding steps 10ª of the strips 10 by suitable means such as the battens 12. The upper edges of the lower strips 11 of wire fabric extend upwardly above the lower edges of the next higher strips 11 of wire fabric, the said edges of the fabric strips being received within vertical slots 13 of the outstanding strips 10. These various transverse strips of fabric 11 have a spaced and parallel relation to the main fabric covering 2 of the screen door and as a fly crawls upwardly upon the screen door it will soon find itself between the main screen or wire fabric 2 and the transverse strips 12 of wire fabric. The fly may enter the confined space between the main screen 2 and the strips 12 of wire fabric through any one of the entrances provided by the overlapping edges of the transverse wire fabric strips 12. As soon as the fly finds itself in one of these confined spaces, it will naturally crawl upwardly in an effort to find a means of escape, and in so doing will readily enter the trap box A from which escape is extremely improbable. The provision of these transversely disposed strips 12 of wire fabric and the stepped arrangement thereof thereby tends to direct the fly into the trap box and renders it almost certain that any fly lighting upon the screen door and starting to crawl upwardly thereon in the usual manner will eventually enter the trap box. The trap box A may be arranged to be withdrawn from the opening in the top of the screen door from either side thereof. Suitable stops 14 are provided for engaging the trap box A upon one side of the screen door, while a spring latch 15 is provided for engaging the trap box on the opposite side of the screen door. The combined action of the stop members 14 and spring latch 15 normally holds the trap box A securely in operative position, although it can be readily removed at any time by first disengaging the spring latch 15 from the edge thereof. One end of each of the complemental sections 4 of the trap box A is shown as provided with a sponge 16 which is retained in position by a suitable upright bar or strip 17. These sponges may either be saturated with something to attract the flies, or with some form of poison for killing the flies after they are caught in the trap.

A modification is shown by Figs. 4 and 5, in which the invention is shown as embodied in a window screen. The frame 1ª of the window screen is formed at the top thereof with an opening to receive the trap box B which is substantially the same in construction as the trap box A, being formed of complemental sections 4ᵇ which are hinged at one end at 6ᵇ and detachably connected at the opposite end by hook members 7ᵇ. The bottom of each of the complemental sections 4ᵇ is formed with an elongated opening 8ᵇ having an upwardly projecting and tapered fabric sleeve 9ᵇ secured to the edges thereof. Transverse screen strips 12ᵇ are secured to outstanding vertical strips 10ᵇ applied to the sides of the screen frame 1ª, the said transverse screen strips 12ᵇ having a spaced and parallel relation to the main screen 2ᵇ, and having a stepped arrangement as in the previous instance. Confined spaces are thus provided between the main screen 2ᵇ and the stepped transversely extending screen or wire fabric strips 10ᵇ which serve as in the previous instance to assist in directing the flies upwardly into the trap box B. Swinging latch members 15ᵇ are also shown as employed instead of the spring latch member 15 to retain the trap box B in position. The natural tendency of any flies lighting upon the screen door to crawl upwardly will first lead them into the confined space between the main screen and the transversely extending stepped screen strips, and in their effort to escape from this confined space they will almost invariably crawl upwardly and enter the trap box. The trap box B may be bodily removed from the screen screen at any time for the purpose of killing the flies caught therein, and the dead flies can be easily removed from the trap box by swinging the two complemental sections thereof apart. In Figs. 4 and 5 the finer wire mesh of the trap box B is shown as reinforced by a coarse wire mesh 19 arranged upon the inner side of the finer wire mesh.

Fig. 6 illustrates a modification in which the trap box is mounted at the top of the door casing, instead of being carried by the screen door, as in the previous instance. The top of the door casing 20 is shown as recessed at the front thereof to provide a seat for the reception of the trap box C which is provided at the bottom thereof with the inlet 21. The trap box rests removably upon bracket arms 22 and is normally retained in position by means of the spring latch members 23. The screen door 24 has the outstanding strips 25 applied to the sides thereof, said strips being arranged at the top of the door and being stepped downwardly as in the previous constructions. The transverse strips or aprons 26 of wire mesh are secured to the various steps of the strips 25 and have a spaced and parallel relation to each other and to the screen door, as previously described. The space or pocket between the strips or aprons 26 and the screen door 24 has the upper end thereof closed by the trap box C when the door is in a closed position, so that flies or insects within the pocket will enter the trap box in their efforts to find a point of escape at the top of the door. The operation of the device is exactly as previously described, the spaces between the overlapping ends of the wire strips or aprons 26 providing inlet openings leading to the pocket between the aprons and the screen door, so that any flies alighting upon the screen door and crawling upwardly in the usual manner will soon find themselves within the pocket, from which they readily enter the trap box.

Having thus described the invention, what I claim as new and desire to secure by Letters Patent, is:—

1. A combined screen and fly trap, including a screen, a trap box extending transversely across the screen and projecting outwardly therefrom, an inlet opening being provided in the bottom of the trap box, and a series of transversely extending strips of wire fabric mounted upon the screen under the trap box so as to have a spaced and substantially parallel relation to each other and to the screen, said fabric strips also having a stepped relation to each other and coöperating with each other and with the screen to provide a series of passages for leading the flies into the trap box.

2. A combined screen and fly trap, including a screen having an opening therein, a trap box fitted within the opening of the screen and projecting laterally therefrom, the bottom of the trap box being provided with an inlet opening, locking means for retaining the trap box in position, and a series of transversely extending strips of wire fabric mounted upon the screen below the trap box, said transverse fabric strips having a substantially spaced and parallel relation to the screen and to each other, and being also arranged in a stepped relation to each other so as to provide a series of entrances leading to the trap box.

3. A combined screen and fly trap, including a screen having an opening in the top thereof, a trap box fitted removably within the opening and formed in complemental sections adapted to be separated to obtain access to the interior thereof, the trap box projecting laterally upon opposite sides of the screen and having inlet openings in the bottom thereof on each side of the screen, locking means for holding the trap box in position within the opening of the screen, outwardly projecting upright strips applied to opposite sides of the screen under the trap box, and a series of transversely extending strips of wire fabric applied to the said outwardly projecting side strips and having a spaced and parallel relation to each other and to the screen, the lower ends of the transverse fabric strips having a stepped relation to each other so as to provide a series of entrance openings for directing flies to the trap box.

In testimony whereof I affix my signature in the presence of two witnesses.

HENRY A. BOUK.

Witnesses:
L. H. WHEELER,
ROBERT L. MCNEEL.

Copies of this patent may be obtained for five cents each, by addressing the "Commissioner of Patents, Washington, D. C."